C. F. JOHNSEN.
COTTON PICKER.
APPLICATION FILED DEC. 1, 1917.
1,295,323.
Patented Feb. 25, 1919.
2 SHEETS—SHEET 1.
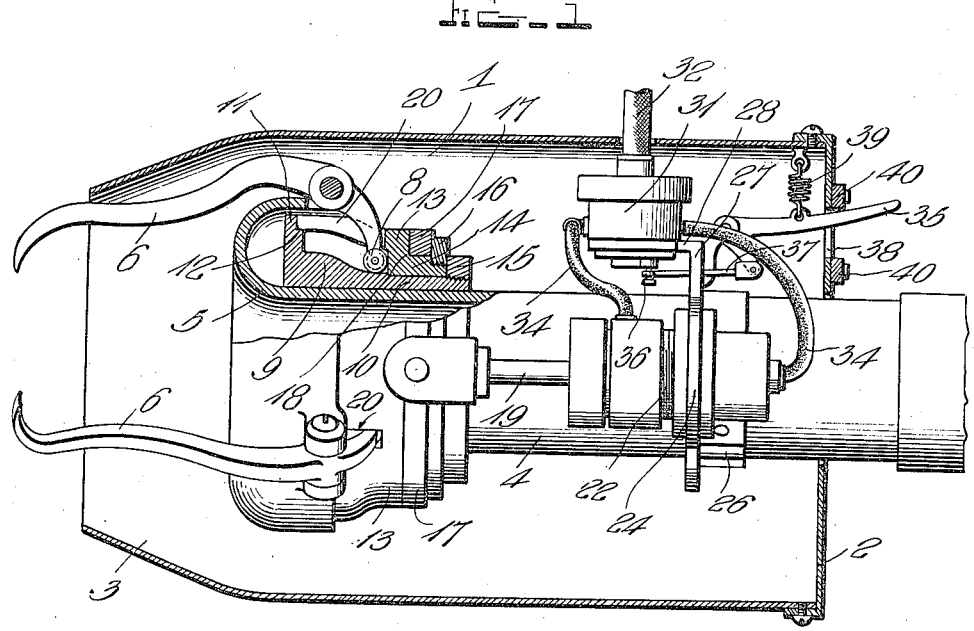
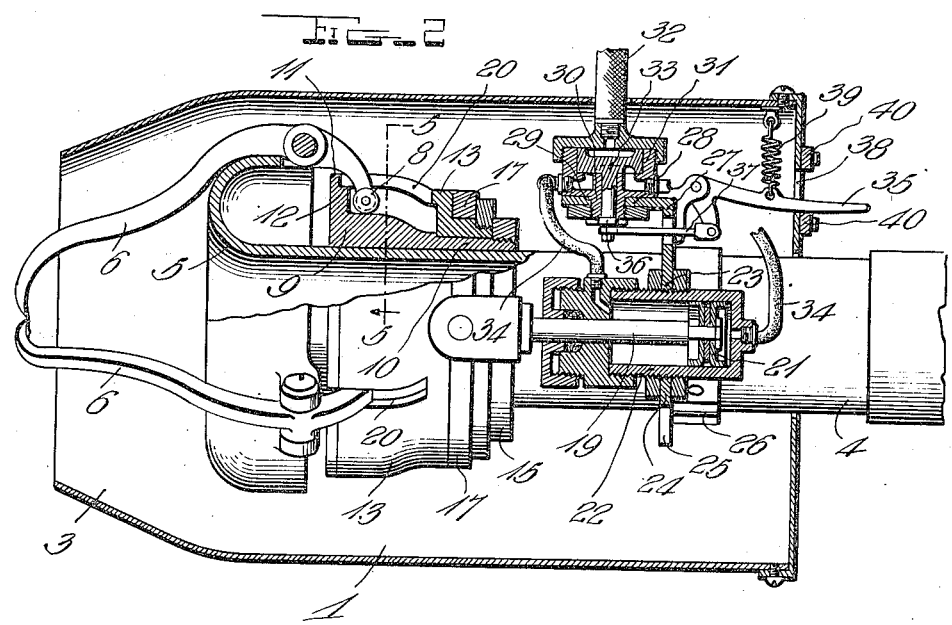
Inventor
Clement F. Johnsen
Witness
By
Attorneys

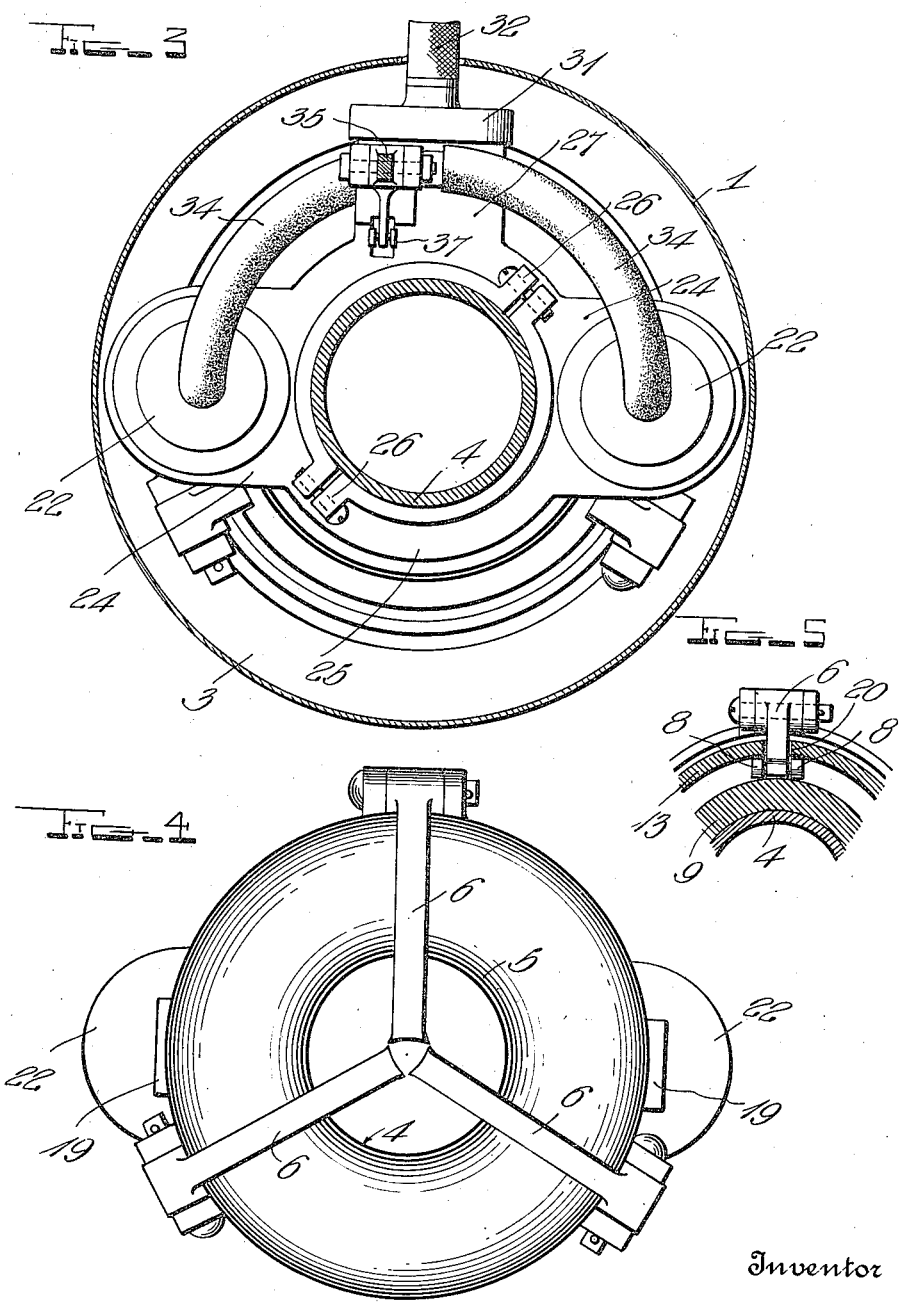

UNITED STATES PATENT OFFICE.

CLEMENT FRITHJOF JOHNSEN, OF PHOENIX, ARIZONA.

COTTON-PICKER.

1,295,323.
Specification of Letters Patent.  Patented Feb. 25, 1919.

Application filed December 1, 1917. Serial No. 204,818.

*To all whom it may concern:*

Be it known that I, CLEMENT F. JOHNSEN, a citizen of the United States, residing at Phoenix, in the county of Maricopa and State of Arizona, have invented certain new and useful Improvements in Cotton-Pickers; and I do declare the following to be a full, clear, and exact description of the invention, such as will enable others skilled in the art to which it appertains to make and use the same.

My invention has for one of its objects to provide a comparatively simple and inexpensive, yet a highly efficient and durable mechanical cotton picker to be used upon cotton picking machines having one or more suction tubes.

In carrying out the above end, a plurality of cotton picking fingers are employed at the front end of the suction tube and a further object is to operate these fingers by pneumatic means, so that the air pressure may be supplied from the usual source on the machine.

In operating the fingers above referred to, a sliding tapered collar is provided, said collar engaging the inner ends of the fingers. A further object is to provide means whereby different areas of the collar may be exposed to the fingers to compensate for wear, means being employed for holding the collar against accidental movement after adjustment.

Yet another object is to provide a novel form of bracket for supporting the operating means of the aforesaid collar.

With the foregoing general objects in view, the invention resides in the novel features of construction and unique combinations of parts to be hereinafter fully described and claimed, the descriptive matter being supplemented by the accompanying drawings which form a part of this specification and in which:—

Figure 1 is a side elevation partly in section showing the normal open position of the picking fingers;

Fig. 2 is an additional elevation partly in section showing the picking fingers in closed position;

Fig. 3 is a rear elevation of the cotton picking head;

Fig. 4 is a front elevation thereof; and

Fig. 5 is a detail transverse section on the plane indicated by line 5—5 of Fig. 2.

In the drawings above briefly described, the numeral 1 designates a hollow cylindrical head closed at its rear end as indicated at 2, whereas its front end is contracted at 3 for reception in the cotton pod, said front end being open. A suction tube 4 extends coaxially into the cylindrical head 1 through the rear end of the latter, the front end of said tube being spaced inwardly from the open front end of said head and being flared as shown at 5 to facilitate the entrance of the cotton bolls. A plurality of cotton picking fingers 6 are pivotally mounted upon the flared end 5 of the tube 4, said fingers extending through the open front end of the head 1 to grasp the bolls of cotton from the pods, so that a slight rearward pull of the device will then effectively remove such bolls.

The rear ends of the fingers 6 are provided with rollers or other suitable shoes 8 which engage a tapered collar 9 mounted slidably on the tube 4 in rear of the flared end 5 thereof. By shifting collar 9 in one direction, the fingers 6 will be closed around the cotton boll, whereas movement of said collar in the other direction will release said fingers to permit the suction in the tube 4 to carry the boll to the machine. The rear end of the collar 9 terminates in a cylindrical portion 10, while the front end of said collar is provided with a circumferential flange 11 having an annular shoulder 12 near its outer edge. A sleeve 13 surrounds the collar 9 and throughout the greater portion of its width is spaced from the tapered part of said collar, this sleeve engaging the rollers 8 to hold them in proper engagement with the collar. The front end of sleeve 13 rests on the annular shoulder 12, whereas the rear end of said sleeve is contracted as indicated at 14 and surrounds the cylindrical part 10 of the collar, said sleeve being held in place by a nut 15 which is threaded on the rear end of said part 10. The nut 15 also holds in place a nut 16 which prevents rearward movement of a ring 17 which surrounds the rear end of sleeve 13, forward movement of said ring being prevented by an annular shoulder 18 formed by reducing the rear end of said sleeve in diameter as above described. To the ring 17 a pair of piston rods 19 are connected and these rods are operated in the manner to be described for alternately moving the collar 9 forwardly and rearwardly.

Constant travel of the rollers 8 against the collar 9, will wear the latter upon restricted surfaces, but due to the arrangement of parts above described, loosening of the nut 15 will permit the collar 9 to be turned within the sleeve 13, so as to expose new surfaces of said collar for engagement with these rollers. Relative rotation of the collar and sleeve is then again prevented by tightening of the nut 15, and turning of the sleeve in question is prevented by the provision of longitudinal slots 20 with which it is provided, the sides of said slots engaging the rear ends of the fingers 6 which pass therethrough as shown clearly in Figs. 1 and 2.

The rear ends of the piston rods 19 are provided with pistons 21 slidable in horizontal cylinders 22, these cylinders being secured in openings 23 in the opposed horizontal arms 24 of a bracket plate 25 which extends transversely of the tube 4, said plate being provided with a suitable clamp 26 whereby it is secured in place upon said tube, in rear of the collar 9. In addition to the horizontal arms 24, the bracket plate 25 is provided with a vertical arm 27 whose upper end is turned downwardly and positioned horizontally as shown at 28, this portion being formed with opening 29 through which an attaching stud 30 of a valve casing 31, passes. Compressed air or other fluid pressure is supplied to the casing 31 by way of a tube 32, and by means of a rotary valve 33 in this casing, this air may be forced into either end of the cylinders 22, the valve casing and said cylinders being in communication by way of tubes 34. When pressure is admitted into one end of either cylinder, the other end thereof is simultaneously placed in communication with a suitable exhaust, by means of the valve 33.

For controlling valve 33, any preferred means could be employed, but I preferably fulcrum a hand lever to the vertical bracket arm 27 and connect one end of said lever with a crank arm 36 of the valve 33, by means of a link 37. The other end of the lever 35 extends rearwardly through a slot 38 in the rear end of the head 1, in convenient reach of the operator, and a coiled spring 39 is provided for normally raising this lever. To prevent battering of the rear end 2 of the picking head, by raising and lowering of the lever 35, wear blocks 40 are preferably provided at the ends of the slot 38.

The spring 39 normally holds the lever 35 in such a position as to cause this lever to set the valve 33 for supplying fluid pressure to the rear ends of the cylinders 22, with the result that the pistons 21 are held in the forward ends of said cylinders, thus so positioning the collar 9 as to retain the picking fingers 6 in opened position. When the fingers are in position around a cotton boll, however, the lever 35 is pressed to the position of Fig. 2. This movement so shifts valve 33 as to admit fluid pressure into the front ends of the cylinders 22, thus causing the pistons 21 to shift collar 9 rearwardly, with the result that the fingers 6 are closed around the boll as will be clear from Fig. 2. The moment the boll is removed from the pod, the lever 35 is released so that the operating means of the fingers automatically releases the boll and permits the latter to be drawn through the suction tube 4 to the machine.

From the foregoing, taken in connection with the accompanying drawings, it will be obvious that although my invention is of extremely simple and inexpensive nature, it will be highly efficient and durable, particular emphasis being laid upon the provision of the cylindrical picking head 1 with its contracted front end 3, upon the suction tube 4 positioned coaxially in the head and having a flared front end spaced inwardly from the open end of such head, and the picking fingers 6 mounted within head 1 and extending through the open end thereof. I also attach great importance to the adjustability of the tapered operating collar 9 to compensate for wear, to the novel mounting of the cylinders 22 and their operating valve, and to the fact that the flared end 5 of suction tube 4 not only facilitates the entrance of the cotton bolls into this tube, but forms an effective support for the several picking fingers. It will of course be understood that these fingers may vary in number. I also wish to explain that in some instances, it may only be necessary to provide one cylinder such as 22, and in other cases the collar might well be shifted forwardly and rearwardly by hand. Furthermore, although the swiveled connection 16, 17, 18 is preferably employed between the piston rods and the sliding collar 9, in order to prevent any possibility of the piston rods binding during their operation, I wish it understood that any other appropriate connection between the parts in question could well be employed. In summarizing the foregoing, it may be stated that although the several specific details shown and described are preferably employed, numerous minor changes may well be made within the scope of the invention as claimed.

I claim:—

1. A cotton picker comprising a cylindrical hollow head having a contracted front end to enter the cotton pod, said end being open, a suction tube extending coaxially into said head through the rear end thereof, the front end of said tube being flared and spaced inwardly from the contracted front end of said head, a plurality of cotton picking fingers mounted in said head and extending therefrom through the open front end thereof, and means for closing said fingers around the cotton boll.

2. A cotton picker comprising a suction tube, a plurality of cotton picking fingers mounted at the front end of said tube, a collar slidable on said tube for operating said fingers, an operating member for said collar extending along said tube, and a swivel connection between said operating member and said collar.

3. A cotton picker comprising a suction tube, a plurality of cotton picking fingers mounted at the front end of said tube, a collar slidable on said tube for operating said fingers, and pneumatic means mounted on said tube for moving said collar forwardly and rearwardly, said means including a hand control for so actuating said means as to move said collar in either direction.

4. A cotton picker comprising a suction tube, a plurality of cotton picking fingers mounted at the front end of said tube, a collar slidable on said tube for operating said fingers, a transverse bracket plate secured on said tube and having a vertically extending arm and a horizontally extending arm, the upper end of said vertical arm being turned downwardly into a horizontal position, said vertical and horizontal arms each having an opening, a cylinder secured in the opening of said vertical arm, a control valve for said cylinder having an attaching portion secured in the opening of the other arm, and a piston in said cylinder having a rod connected with said collar.

5. A cotton picker comprising a suction tube, a plurality of cotton picking fingers pivoted at the front end of said tube, a collar slidable on said tube and engaging the rear end of said fingers, said collar being tapered to operate said fingers when shifted and being rotatable to expose different wearing surfaces to said fingers, means for locking said collar against rotation after adjustment thereof, and means for operating said collar.

6. A cotton picker comprising a suction tube, a plurality of cotton picking fingers pivoted at the front end of said tube and having shoes on their rear ends, a tapered collar slidable along said tube and engaging said shoe for operating said fingers, a sleeve secured around said collar and having longitudinal slots through which said fingers extend, whereby rotation of said sleeve is prevented, means for securing said sleeve and collar relatively to each other and for permitting turning of the latter in the former, and means for sliding said collar forwardly and rearwardly along the tube.

In testimony whereof I have hereunto set my hand in the presence of two subscribing witnesses.

CLEMENT FRITHJOF JOHNSEN.

Witnesses:
  ALBERT SOPHUS HANSON,
  FRANK WOODS.